United States Patent [19]

Tan et al.

[11] 3,790,892

[45] Feb. 5, 1974

[54] CLOCK PULSE REGENERATING CIRCUIT FOR DEMODULATING INPUT PULSE SIGNAL HAVING UNEVEN TIME PULSE DISTRIBUTION

[75] Inventors: Yoichi Tan; Toshihiko Ryu, both of Tokyo, Japan

[73] Assignee: Nippon Electric Company, Limited, Tokyo-to, Japan

[22] Filed: May 18, 1972

[21] Appl. No.: 254,723

[30] Foreign Application Priority Data

May 24, 1971 Japan .............................. 46/34774

[52] U.S. Cl. ................................ 328/120, 328/164

[51] Int. Cl. ........................................ H03k 5/18

[58] Field of Search .... 328/120, 164; 307/232, 234, 307/269

[56] References Cited

UNITED STATES PATENTS

| | | | |
|---|---|---|---|
| 3,617,905 | 11/1971 | Castelli | 328/120 |
| 3,646,451 | 2/1972 | Shoap | 328/120 X |
| 3,153,762 | 10/1964 | Johnson | 328/120 X |

*Primary Examiner*—Stanley D. Miller, Jr.
*Attorney, Agent, or Firm*—Sughrue, Rothwell, Mion, Zinn and Macpeak

[57] ABSTRACT

A clock pulse regenerating circuit for stably extracting clock pulses from a signal pulse train having an uneven pulse distribution in the time domain. The regenerating circuit includes circuitry for generating auxiliary clock pulses corresponding to recycled previously extracted clock pulses when the signal pulse train lacks pulses for a predetermined time interval.

4 Claims, 5 Drawing Figures

PATENTED FEB 5 1974

3,790,892

SHEET 1 OF 2

CLOCK PULSE REGENERATING CIRCUIT FOR DEMODULATING INPUT PULSE SIGNAL HAVING UNEVEN TIME PULSE DISTRIBUTION

BACKGROUND OF THE INVENTION

The present invention relates to a synchronizing circuit for a pulse signal transmission system and, more particularly, to a clock regenerating circuit.

In general, a pulse signal transmission system requires clock pulses to bit by bit synchronize the receiving station with the transmitting station. In a conventional technique developed for this purpose, clock pulses are transmitted together with information signal pulses from the transmitter to the receiver. In another method, a clock pulse component is extracted at the receiver from the information signal pulses. In the latter method, however, it is difficult to stably extract the clock pulse component from the signal pulse train, thus increasing the transmission error.

In order to ensure the stable extraction of clock pulses, a method has been proposed, in which a tuning (or tank) circuit and a phase-locked oscillator are employed singly or in combination. In such a method, however, the possible phase or frequency fluctuation of the input signal pulses often becomes so great that the phase-locked oscillator becomes unable to satisfactorily follow them. Therefore, this method is not believed reliable in practical use.

SUMMARY OF THE INVENTION

An object of the present invention is to provide a clock pulse regenerating circuit which is free from the influence caused by the frequency fluctuation.

Another object of the present invention is to provide a clock pulse regenerating circuit which ensures the stable regeneration of clock pulses even when the mark ratio of the input signal pulse train is low.

In the clock pulse regenerating circuit of the present invention, clock pulses are conventionally extracted from a train of original signal pulses fed as input pulse signals. When no pulse arrives for a certain period of time, a pulse previously extracted from the signal pulse train and passed through a delay circuit is added as an auxiliary pulse to the clock pulses taken out from the original signal pulse train. Insofar as no further original pulse arrives, the auxiliary pulse is also cyclically passed through the delay circuit over and over again (the number of the recycling may be predetermined), for the purpose of obtaining sequential auxiliary clock pulses. In other words, the clock pulses having the same repetition period as the delay time of the delay circuit are obtained while there is no incoming original signal pulse. In this way, the clock pulses can be stably regenerated even when the mark ratio of the input pulse train is lowered.

BRIEF DESCRIPTION OF THE DRAWINGS

The present invention will now be described in detail with reference to the accompanying drawings, wherein.

DETAILED DESCRIPTION OF THE PREFERRED EMBODIMENTS

Figures 1, 2, 3:
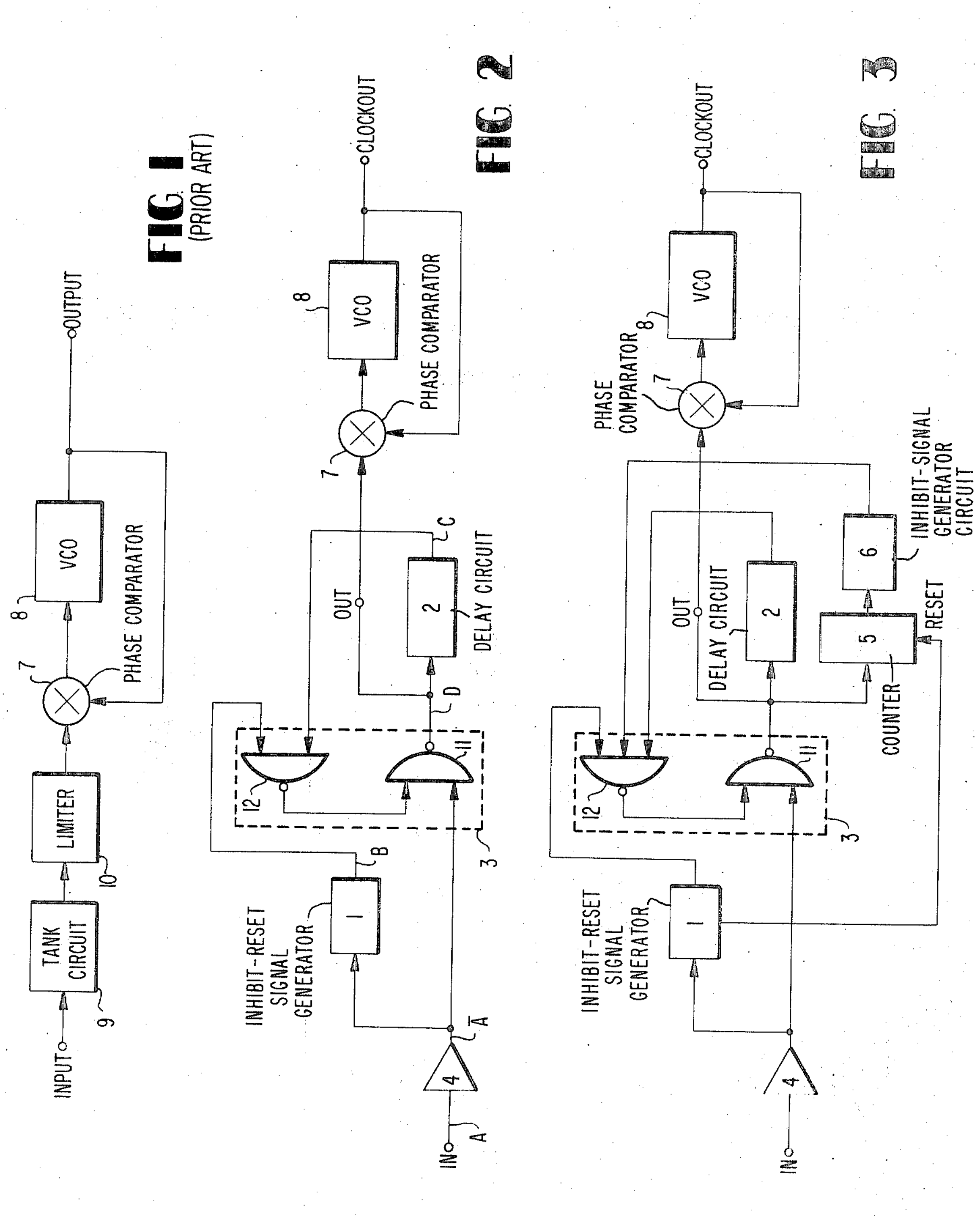
FIG. 1 (PRIOR ART), FIG. 2, FIG. 3
FIG. 1 is a block diagram showing a conventional clock pulse regenerating circuit for a pulse signal transmission system.
FIG. 2 is a block diagram showing a clock pulse regenerating circuit which employs one embodiment of the instant invention.
FIG. 3 is a block diagram showing a clock pulse regenerating circuit which employs another embodiment of the instant invention.

In the conventional circuit shown in FIG. 1, an LC-tuning circuit (tank circuit) 9 and a limiter circuit 10 are connected to an oscillator circuit. In this oscillator circuit, a voltage-controlled oscillator (VCO) 8 is driven by the output of a phase comparator 7. In this conventional system, clock pulses are obtained relying on the damped oscillations of the LC tank circuit. If the quality factor Q of the LC tank circuit 9 is high, the detection sensitivity can be kept at an acceptable value even when the mark ratio of the input signals is decreased. However, the phase error is increased in portion to the time interval in which no original signal pulse arrives. In addition, the tank circuit 9 tends to retain the influence of each signal pulse over a long period of time, with the result that the phase error etc. of the input signal pulse train tends to be accumulated. Thus, jitter is apt to appear in the output. Another problem is that although a higher Q tank circuit ensures compensation of the detection sensivity, stability with respect to temperature change deteriorates.

In the present invention, the tank circuit 9 and the limiter circuit 10 are replaced with a digital circuit. Since the auxiliary pulses are inserted as clock pulses when there is no incoming original signal pulse, the phase error is alleviated. The adverse effect of the preceding pulses is eliminated owing to the perfect resetting, which takes place every time a fresh signal pulse arrives. The accumulation of phase errors and the like is thus avoided, also improving the stability against the temperature variation.

Figure 4:
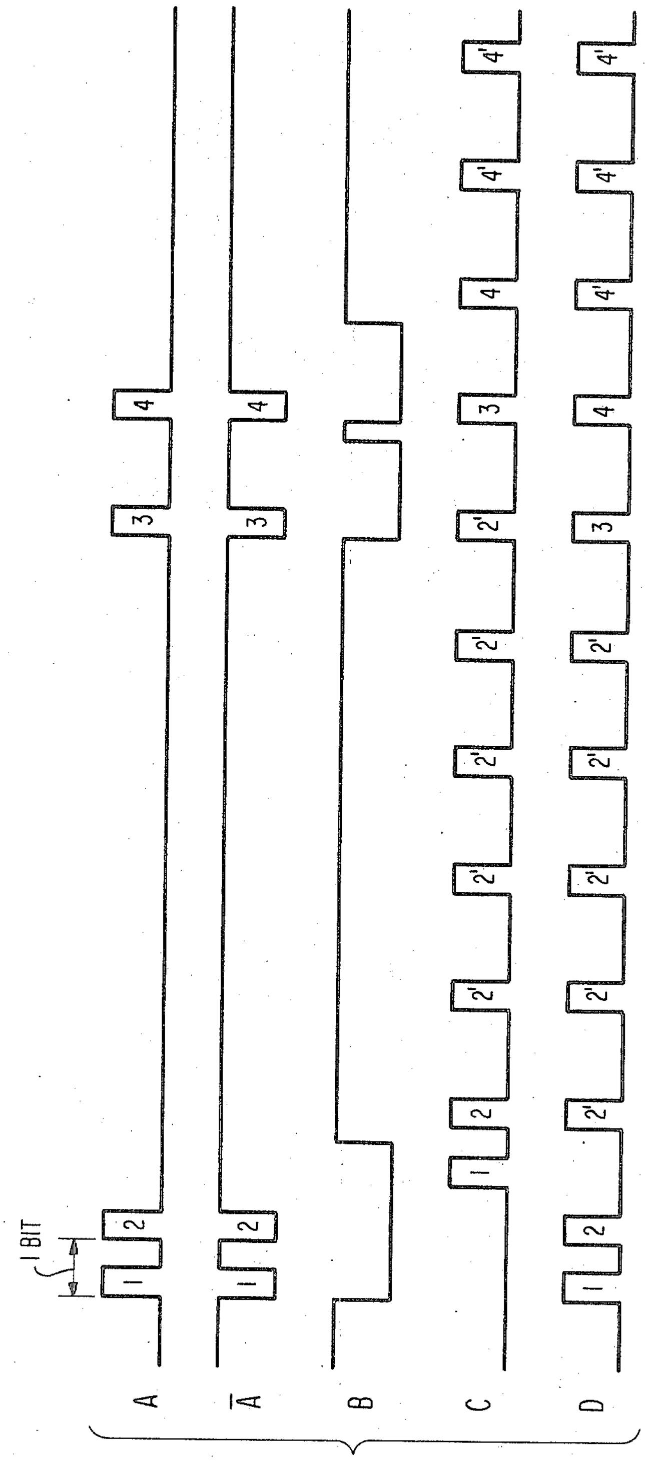
FIG. 4 is a timing chart illustrating the operation of the first embodiment of the invention.

Referring to FIGS. 2 and 4 which illustrate an embodiment of the present invention and its operation, the arrival of original signal pulses A (FIG. 4) results in the regeneration of clock pulses D (FIG. 4) by virtue of the auxiliary pulses. The pulses shown in FIG. 4 are given reference numerals which correspond to those appearing at the positions indicated in FIG. 2. In FIG. 2, numeral 1 designates an inhibit-reset signal generator; 2, a delay circuit (which effects a delay equivalent to a 2-bit interval in this case); 3, a pulse combining circuit which has not only the function of combining the original signal pulses with the auxiliary pulses but also the function of inhibiting the combining under certain conditions; "IN," an input terminal receiving original signal pulses (A in FIG. 4); 4, an inverter; and "OUT," an output terminal of the circuit arrangement of the present invention from which the clock pulses (D in FIG. 4) are extracted.

This circuit construction forms the first embodiment of the invention, and is used in combination with the phase-locked oscillator comprising the phase comparator 7 and the voltage-controlled oscillator 8. An inverted pulse train derived from the original signal pulse train passing through inverter 4 is fed to the input terminal "IN" and is transmitted to the output terminal "OUT" through a NAND circuit 11 of the pulse combining circuit 3. When the original signal pulses are received at a certain interval (herein, a 2-bit interval), they are supplied as output clock pulses to the pulse output terminal OUT. At this time point, the auxiliary pulses fed via the delay circuit 2 to the pulse combining circuit 3 do not have to be transmitted to the output terminal OUT.

In order to inhibit the undesired transmission of the auxiliary pulses, the original signal pulses from the input terminal IN and inverter 4 are also applied to the inhibit-reset signal generator 1 (consisting of a retrigger-type monostable multivibrator having the time constant equivalent to 1.7 bit time interval), while they are applied to the pulse combining circuit 3. An inhibit-reset signal is supplied from the inhibit-reset signal generator 1 to the NAND gate 12 of the pulse combining circuit 3. The NAND gate 12 also receives the delayed output clock pulses, that is, the auxiliary pulses produced by the 2-bit delay circuit 2. Thus, an auxiliary pulse received at NAND gate 12 within a 1.7 bit time interval from the last original signal pulse is inhibited.

On the other hand, the inhibit-reset signal generator 1 does not provide any inhibit-reset signal so long as the time interval between successive original signal pulses is longer than the predetermined interval (2-bit interval). The auxiliary pulse is, therefore, transmitted from the pulse combining circuit 3 to the output terminal OUT posterior to the time point of the reception of the original signal pulse by a predetermined time interval (2-bit interval) set at the delay circuit 2. Furthermore, the auxiliary pulse is passed through the delay circuit, so that it may be recycled through the pulse combining circuit 3 to the output terminal OUT at a repetition rate defined by the delay time of the delay circuit until the next original signal pulse arrives. The pulse train obtained at the output terminal OUT is accordingly changed as compared to the original signal pulses. As shown at D in FIG. 4, the pulse train, in the absence of original signal pulses, has a repetition period equal to the delay time of the delay circuit 2.

The clock pulse train is supplied to the phase-locked oscillator coupled to the clock pulse regenerating circuit of the present invention, to achieve a more accurate regeneration of the clock pulses.

Figure 5:
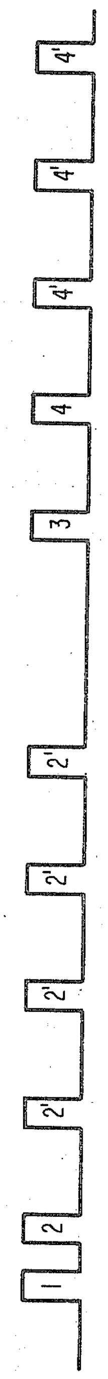
FIG. 5 is also a timing chart illustrating the operation of the second embodiment of the instant invention.

Referring to FIG. 3 which shows a block diagram of another embodiment of the present invention, there is provided an N-ary counter 5 (N being an integer) and an inhibit signal generator circuit 6 in addition to the circuit arrangement of FIG. 2. As has been stated, in the circuit arrangement of FIG. 2, the auxiliary pulses are repeatedly inserted until the arrival of the next original signal pulse. In contrast, in the circuit of FIG. 3, the number of auxiliary pulses is read at the counter 5. After the maximum number N of output auxiliary pulses are generated, a signal to inhibit any pulse from arriving from the delay circuit 2 is provided by the inhibit signal generator circuit 6, and supplied to the pulse combining circuit 3. Therefore, the inhibit signal prevents the number of successive auxiliary pulses from exceeding the maximum number N, as shown in FIG. 5. If the next original signal pulse arrives before the generation of the N-th auxiliary signal, a counter-resetting signal is supplied from the inhibit-reset signal generator 1 to the counter. By this signal, the counter is reset before all the N auxiliary pulses are produced.

Such a measure is taken for the following reasons. Since the auxiliary pulses inserted according to the present invention are "auxiliary pulses" as the term signifies, these pulses unavoidably undergo a certain amount of phase shift. When the auxiliary pulses are large in number, the phase shifts are accumulated. The embodiment therefore intends to achieve the optimum condition where the auxiliary pulses are inserted to produce the clock pulses with the phase shift limited to a marked extent.

For a more stabilized regeneration of clock pulses, the circuit arrangement of the present invention may be combined with the phase-locked oscillator, as illustrated in FIGS. 2 and 3. Needless to say, the present circuit arrangement exhibits, as it is, an excellent performance as a pulse regenerating circuit.

While the inhibit-reset signal generator has been described as being composed of a multivibrator in the foregoing, it may be a delay circuit. Alternatively, this signal generator may be dispensed with, if the delay time of the delay circuit 2 corresponds to 1 bit.

We claim:

1. A clock pulse regenerating circuit for demodulating an input pulse signal having an uneven pulse distribution in the time domain comprising;

means for deriving clock pulses from said input pulse signal, means coupled to said clock pulse derivation means for delaying said clock pulses a predetermined period of time, and means for detecting the absence of pulses in said input pulse signal for at least a predetermined time interval, said clock pulse derivation means being responsive to said detecting means for reproducing the last delayed clock pulse when said input pulse signal is absent pulses for at least said predetermined time interval at a repetition rate determined by said delay means, wherein said detecting means comprises first logic means responsive to said delayed clock pulses for producing an enable signal in response to the receipt of a delayed clock pulse after said predetermined time interval, said means for deriving clock pulses comprising second logic means, for reporducing the last delayed clock pulse in response to said enable signal, and counter means for counting the number of derived clock pulses and an inhibit signal generation means, responsive to a predetermined count in said counter means, for producing an inhibit signal, said first logic means being responsive to said inhibit signal whereby the generation of an enable signal is prevented during the existence of said inhibit signal.

2. The clock pulse regenerating circuit of claim 1 further including means for resetting said counter means in response to the receipt of a pulse in said input pulse signal.

3. The clock pulse regenerating circuit of claim 1 further comprising an oscillator circuit including a phase detector and voltage controlled oscillator coupled to said clock pulse deriving means.

4. A clock pulse regenerating circuit for demodulating an input pulse signal having an uneven pulse distribution in the time domain comprising;

means for deriving clock pulses from said input pulse signal, means coupled to said clock pulse derivation means for delaying said clock pulses a predetermined period of time, and means for detecting the absence of pulses in said input pulse signal for at least a predetermined time interval, said clock pulse derivation means being responsive to said detecting means for reproducing the last delayed clock pulse when said input pulse signal is absent pulses for at least said predetermined time interval at a repetition rate determined by said delay means, wherein said detecting means comprises first logic means responsive to said delayed clock pulses for producing an enable signal in response to the receipt of a delayed clock pulse after said predetermined time interval and an inhibit-reset circuit coupled to said first logic means for controlling the duration of said predetermined time interval, said means for deriving clock pulses comprising second logic means, for reproducing the last delayed clock pulse in response to said enable signal, and wherein said first and second logic means comprise NAND gates and said inhibit-reset circuit comprises a monostable multivibrator producing an inhibit signal lasting said predetermined time interval to disable the NAND gate comprising said first logic means whereby the generation of said enable signal is prevented during the existence of said inhibit signal.

* * * * *